United States Patent [19]
Rocholl et al.

[11] Patent Number: 4,942,945
[45] Date of Patent: Jul. 24, 1990

[54] BRAKE CYLINDER

[75] Inventors: Hans Rocholl; Horst Klein, both of Remscheid, Fed. Rep. of Germany

[73] Assignee: Bergische Stahl-Industrie, Remscheid, Fed. Rep. of Germany

[21] Appl. No.: 237,215

[22] Filed: Aug. 26, 1988

[30] Foreign Application Priority Data

Aug. 27, 1987 [DE] Fed. Rep. of Germany ....... 3728606

[51] Int. Cl.⁵ .............................................. F16D 65/66
[52] U.S. Cl. .................................................. 188/202
[58] Field of Search ................... 188/196 D, 202, 203; 74/574

[56] References Cited

U.S. PATENT DOCUMENTS

| 1,949,520 | 3/1934 | Whisler | 74/574 |
| 3,297,116 | 1/1967 | Sander et al. | 188/196 D |
| 3,520,387 | 7/1970 | Natschke | 188/202 |
| 3,595,347 | 7/1971 | Billeter | 188/202 |
| 3,983,975 | 10/1976 | Wright | 188/196 D X |
| 4,033,642 | 7/1977 | Sorgatz et al. | 74/574 X |
| 4,493,401 | 1/1985 | Sander et al. | 188/202 X |
| 4,646,882 | 3/1987 | Holloway et al. | 188/202 |
| 4,721,190 | 1/1988 | Schmidt et al. | 188/196 D X |

FOREIGN PATENT DOCUMENTS 0036568 9/1981 European Pat. Off. ............ 188/203

*Primary Examiner*—Andres Kashnikow
*Attorney, Agent, or Firm*—Robert W. Becker & Associates

[57] ABSTRACT

A brake cylinder, especially for rail vehicles, with a simple-acting linkage regulator for maintaining a uniform play between the brake surfaces. A nut that is disposed upon a threaded spindle is connected with first coupling surfaces that cooperate with second coupling surfaces disposed on the piston of the control or operating cylinder. A coupling element that is provided with the first coupling surfaces is further provided with a centrally disposed pin that is guided in the piston of the cylinder. A spring or other member that is under pressure is clamped onto the pin, with this member being secured in such a way that it cannot shift parallel to the axis of the pin nor can it rotate with the pin.

4 Claims, 1 Drawing Sheet

BRAKE CYLINDER

BACKGROUND OF THE INVENTION

The present invention relates to a brake cylinder, especially for rail vehicles, that has a built-in, simple-acting linkage regulator for maintaining a uniform play between the brake surfaces. The regulator includes two parts that can be shifted telescopically relative to one another, with one part being embodied as a spindle having a screw thread, and the other part being fixedly connected to a nut that is screwed onto the non self-locking thread of the spindle. This other part is disposed on a coupling part that is provided with coupling surfaces that cooperate with coupling surfaces of a piston of the control or operating cylinder.

A number of embodiments of such linkage regulators are known (see, for example, German Offenlegungsschrift 22 01 082). However, the drawback of all of these heretofore known constructions is that the vibrations and impacts that are produced during the rough operation that is encountered in practice also influence the linkage regulator to the extent that uncontrolled rotations are produced in the coupling element of the linkage regulators, which can annul the function of the regulator.

It is therefore an object of the present invention, with relatively straightforward means, to eliminate every unintended rotation in the linkage regulator, so that the adjustment of the air gap remains constant and does not lead to different air gaps.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

The brake cylinder of the present invention is characterized primarily in that: the coupling element, which is provided with coupling surfaces, is further provided in a known manner with a centrally disposed pin that is guided in the piston of the cylinder; and a spring or some other member that is under pressure is clamped onto the pin, with this member being secured in such a way that it cannot shift parallel to the axis of the pin nor can it rotate with the pin.

An approximately U-shaped spring is advantageously clamped onto the pin. This spring is disposed loosely in a groove or slot in the piston in order to prevent shifting parallel to the axis of the pin or of the coupling element. In addition, the spring is secured against rotation, relative to the pin or to the coupling element, via, for example, an angled-off end that is disposed in a radially extending bore that branches off from the groove or slot in the piston.

The clamping tension of the spring is expediently less than the force that rotates the coupling element.

The advantage of the inventive configuration for a linkage regulator is obvious. The spring extensively suppresses all vibrations and impacts in all axes, thereby, especially under the influence of resonance effects, preventing the coupling element from rotating on its own and hence changing the air gap in an unacceptable manner.

Further specific features of the present invention will be described in detail subsequently.

DESCRIPTION OF PREFERRED EMBODIMENTS

Figure 1:
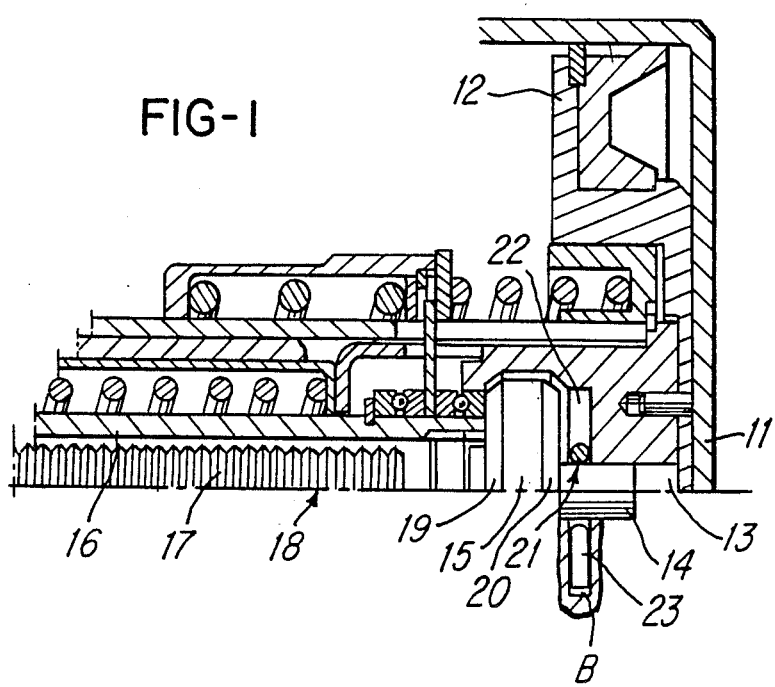
FIG. 1 is a cross-sectional view through the cylinder end of one exemplary embodiment of the inventive arrangement.

Referring now to the drawing in detail, as shown in FIG. 1 the piston 12 of the control or operating cylinder 11 is provided with a bore 13. A pin 14 extends in this bore 13 and is displaceable therein. The pin 14 is connected to the coupling element 15, which in turn is connected to the tube 16, the non-illustrated end of which carries the nut that meshes with the thread 17 of the spindle 18. The coupling element 15 is provided with the coupling surfaces 19 and 20, which cooperate with the corresponding coupling surfaces in the piston 12 in such a way that the surfaces 19 remain closed or in contact until an adjustment is necessary. At that point, the coupling surfaces 19 are opened, i.e. contact is broken, but the coupling surfaces 20 are not yet closed or in contact. In this moment, the coupling element 15 begins to rotate. To dampen this rotational movement, a spring 21 is clamped onto the pin 14. This spring 21 is disposed in a groove or slot 22 in the piston 12; this groove or slot prevents shifting of the spring 21 parallel to the longitudinal axis of the pin 14.

Figure 2:
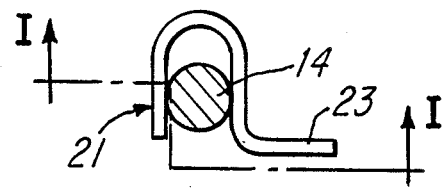
FIG. 2 is a plan view that shows a spring of the present invention on the pin.

As shown in FIG. 2, the spring 21 has an approximately U-shaped configuration the one leg 23 of which is extended and is then bent or angled off to the side. The angled-off leg 23 cooperates with a radial bore as indicated in FIG. 1 in the groove or slot 22. The angled-off leg 23 is disposed in the plane of the spring 21 and prevents this spring from being able to rotate on the pin 14, or on the coupling element 15 secured thereto, unless an adjustment is necessary. Therefore, the force of the spring 21 must in every case be less than the force that originates from the nut, and rotates the coupling element 15, by such an amount that rotation of the pin 14 and the coupling element 15 for adjustment of the air gap is not prevented.

It would also be possible to dispose the angled-off leg 23 at 90° to the plane of the spring 21, whereupon this leg 23 would be fixed in an axially extending bore or groove.

It is to be understood that in place of the spring 21, it would also be possible to use a different member that is pressed under spring tension against the pin 14. It is also possible to use other damping materials. In addition, the material of this spring could have other than a round cross-sectional shape, for example if it is made of band steel.

The present invention is, of course, in no way restricted to the specific disclosure of the specification and drawing, but also encompasses any modifications within the scope of the appended claims.

What we claim is:

1. In a brake cylinder, for rail vehicles, that has a built-in, simple-acting linkage regulator for maintaining a uniform play, with said regulator including two parts that can be shifted telescopically relative to one another, whereby one part is embodied as a spindle with a screw thread, and the other part is fixedly connected and screwed onto said spindle, with said other part that is connected being disposed on a coupling element that is provided with first coupling surfaces that cooperate with second coupling surfaces of a piston of an operating cylinder, comprising the improvement therewith wherein:

said coupling element, which is provided with said first coupling surfaces, is further provided with a centrally disposed pin that is guided longitudinally thereof in said piston of said cylinder; and a damping member that is under pressure is clamped transversely onto said pin, with said damping member being secured in such a way that it cannot shift parallel to a longitudinal axis of said pin nor can it rotate with said pin to eliminate every unintended rotation in the linkage regulator for maintaining the uniform play so that adjustment remains constant and cannot vary, said damping member also being provided with the linkage regulator in a location and arranged to extensively suppress all vibrations and impacts in all axes, thereby even under the influence of resonance effects, preventing the coupling element from rotating on its own and hence changing the adjustment in an unacceptable manner, said damping member serving to eliminate every unintended rotation in the linkage regulator to avoid annulment of function thereof.

2. A brake cylinder according to claim 1, in which said member that is clamped onto said pin is an approximately U-shaped spring that is loosely disposed in a groove or slot of said piston to prevent shifting of said spring parallel to longitudinal axis of said pin, with said spring also being disposed in said piston in such a way as to prevent rotation of said spring with said pin.

3. A brake cylinder according to claim 2, in which said U-shaped spring has an extended leg that is angled-off from the remainder of said spring, with said angled-off leg being secured to of said piston.

4. A brake cylinder according to claim 1, in which said member that is clamped onto said pin has a tensioning force that is less than a force that rotates said coupling element.

* * * * *